Jan. 12, 1960 N. I. BOHLIN 2,920,848
HEADREST FOR AIRPLANE EJECTION SEAT
Filed Nov. 8, 1956 4 Sheets-Sheet 1

Inventor
Nils Ivar Bohlin
By
Attorney

Jan. 12, 1960 N. I. BOHLIN 2,920,848
HEADREST FOR AIRPLANE EJECTION SEAT
Filed Nov. 8, 1956 4 Sheets-Sheet 2

Inventor
Nils Ivar Bohlin
By
Attorney

Jan. 12, 1960 N. I. BOHLIN 2,920,848
HEADREST FOR AIRPLANE EJECTION SEAT
Filed Nov. 8, 1956 4 Sheets-Sheet 3
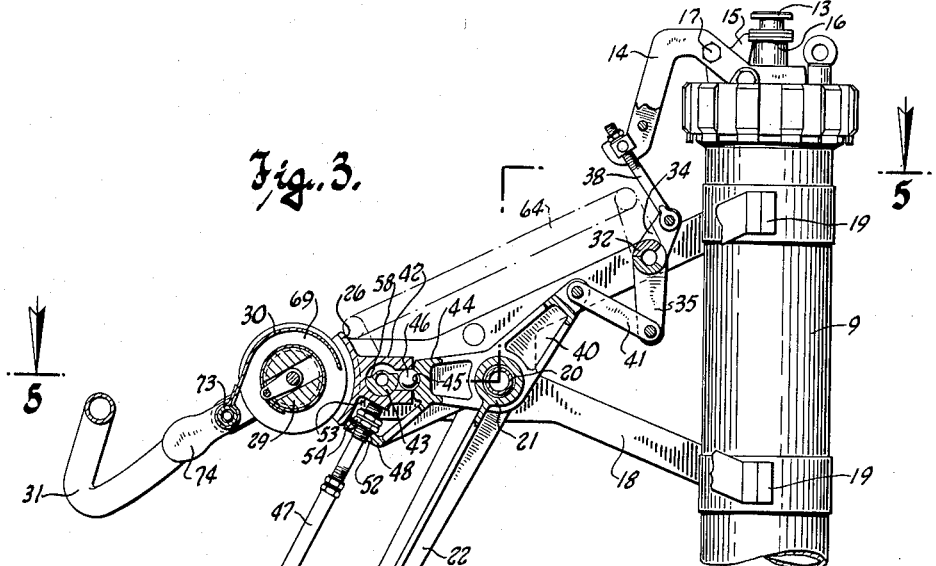
Fig. 3.
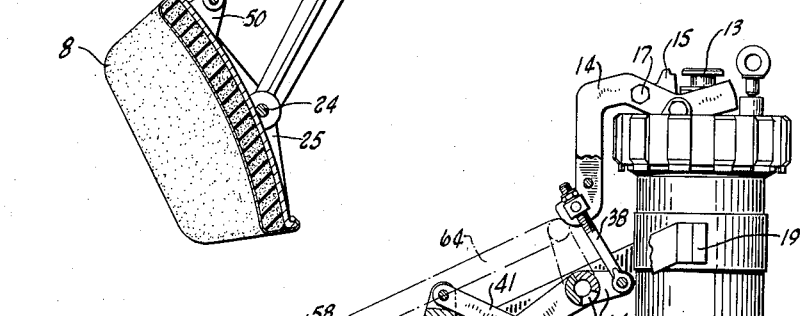
Fig. 4.
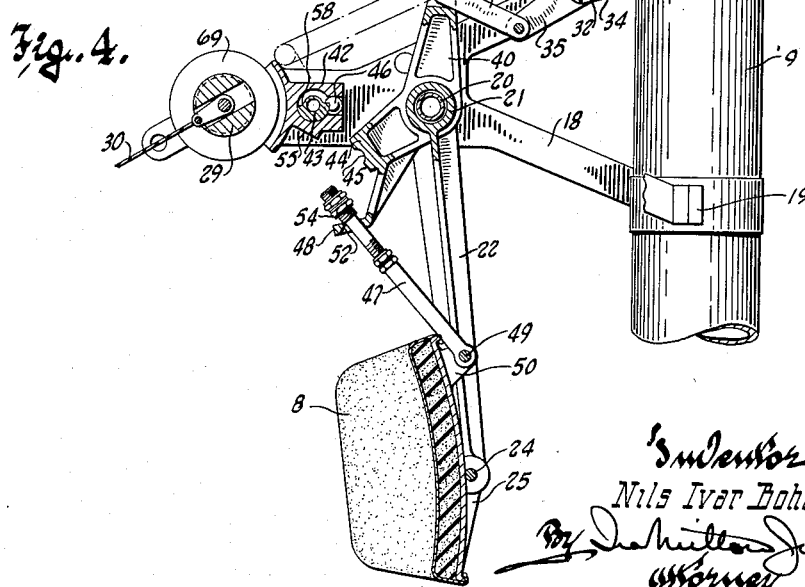
Inventor
Nils Ivar Bohlin

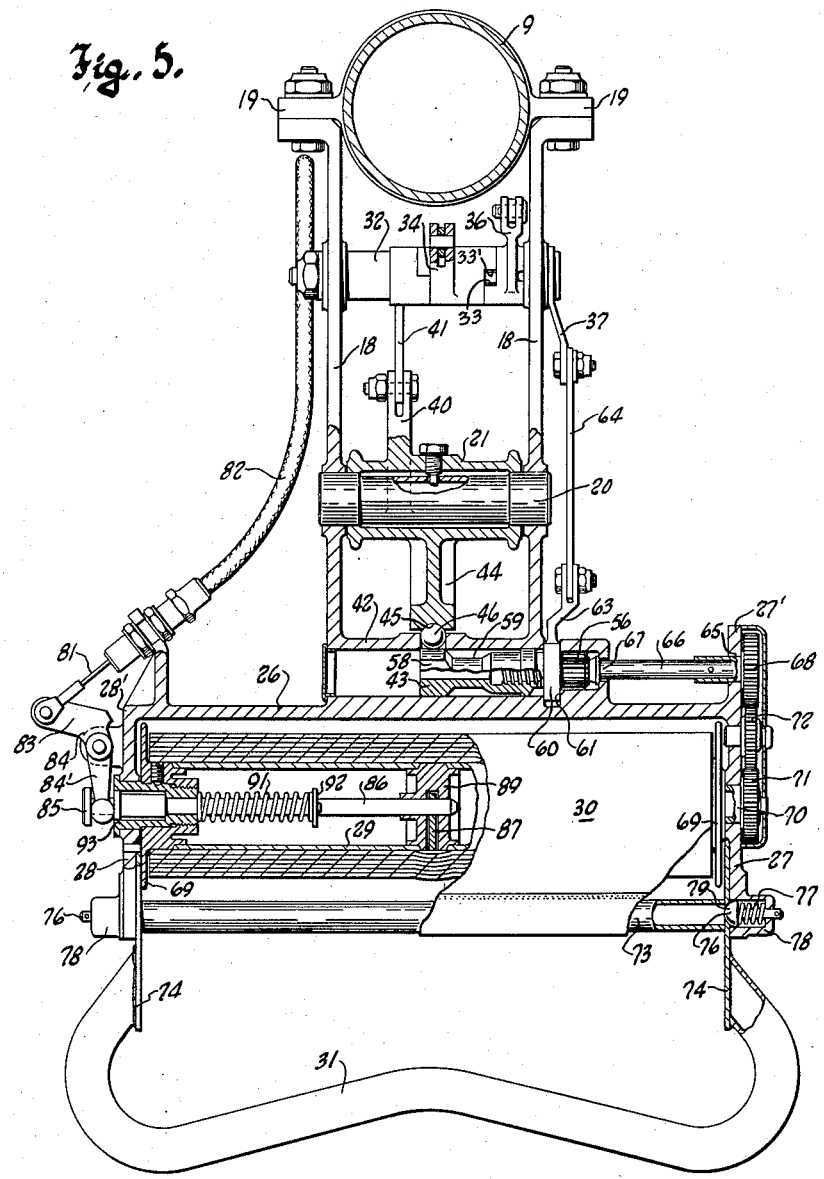

United States Patent Office 2,920,848
Patented Jan. 12, 1960

2,920,848

HEADREST FOR AIRPLANE EJECTION SEAT

Nils I. Bohlin, Linkoping, Sweden, assignor to Svenska Aeroplan Aktiebolaget, Linkoping, Sweden, a corporation of Sweden Application November 8, 1956, Serial No. 621,059

Claims priority, application Sweden November 16, 1955

9 Claims. (Cl. 244—122)

This invention relates to airplane ejection seats and refers more particularly to means for initiating operation of the ejection mechanism by which an airman's seat may be propelled out of an airplane in the event of an emergency which necessitates abandonment of the aircraft in flight.

As is well known, the speed of modern high performance airplanes creates serious problems when emergency escape from such aircraft becomes necessary in flight; and to overcome these problems mechanical devices are employed which assist the crew to leave the airplane in an emergency. If an airman left such an airplane simply by jumping from it, his body would immediately be subjected to the force of the air blast created by forward motion of the plane, by which he might be violently thrown against the tail surfaces or other parts of the ship.

It has therefore become conventional to provide so-called ejection seats for crew members of high speed aircraft, and particularly in military airplanes. With such a mechanism, the airman confronted with the need for leaving an airplane in flight actuates an emergency control, and thereupon mechanism in the airplane propels his seat through a hatch or canopy opening, literally throwing the flier clear of the ship. The airman is of course strapped to the seat, and is provided with a parachute which is also secured to his person.

Obviously ejection of the seat must be positive and certain, and a very substantial force is therefore required to propel the airman and his seat out of the airplane, with the result that the airman's body is subjected to large acceleration forces in the initial stage of seat ejection. Moreover, immediately after ejection the airman is subjected to the violent blast of the slip stream or relative wind as he leaves the cabin or cockpit of the airplane. It is therefore essential that at the moment of ejection the airman's posture shall be that which is best adapted to receiving the forces to which he will be subjected, and that his face shall be protected against the wind stream which he encounters immediately upon leaving the aircraft.

With the foregoing considerations in mind, it is an object of this invention to provide, in an airplane ejection seat of the character described, a headrest for the occupant of the seat which at all times supportingly engages the back of his head, and which is movable from a normal forward position in which ample vision is afforded for operation of the airplane to a rearward ejecting position in which the head is held in an upright attitude best suited for ejection of the seat, and which headrest is held in its normal position by latch means until a manually operable actuator is moved for the purpose of initiating seat ejection whereupon said latch means is released.

Another object of this invention resides in the provision of an ejection seat of the character described, adapted to be propelled out of an airplane by detonation of an explosive charge and having a wind screen which the occupant of the seat may pull downwardly in front of his face to protect the same during seat ejection; wherein downward and forward motion of the wind screen releases a headrest on the seat for movement from a normal forward position to a rearward seat ejecting position; and wherein such movement of the headrest effects actuation of a mechanism whereby the explosive charge is detonated to propel the seat out of the airplane.

Still another object of this invention resides in the provision of an aircraft ejection seat which provides assurance that during ejection of the seat the occupant will necessarily assume a posture such that all parts of his body will be best protected; wherein such assurance is had by reason of the fact that detonation of a propulsive powder charge for the seat is effected by movement of a headrest on the seat from a normal forward position to a rearward seat ejection position; and wherein the headrest may be released for such movement by manual movement of an actuator to bring a wind screen downwardly in front of the occupant's face to protect the same.

A further object of this invention resides in the provision of an ejection seat in which the previously stated objects are attained, and wherein, moreover, detonation of the seat ejecting explosive charge may be effected by actuation of an auxiliary manually operable actuator, which actuator also releases latch means holding a headrest on the seat in a normal forward position and assures that when the charge is detonated the headrest will be in a rearward position in which the seat occupant's head is supportingly held in an upright attitude suitable for seat ejection.

It is also an object of this invention to provide main and auxiliary means for initiating seat ejecting operation of an aircraft ejection seat, both of which means are readily accessible to the seat occupant, are adapted to be actuated in a simple and natural manner, and assure that at the moment of ejection the occupant of the seat will have assumed a posture in the seat which best protects all parts of his body.

It is another object of this invention to provide manually operable mechanism for initiating ejecting action of an ejection seat of the character described which mechanism is simple and rugged in construction and dependable in operation.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is a vertical sectional view of the same portion of the ejection seat of this invention as is shown in Figure 2, the headrest being shown in its normal or forward position;

Figure 4 is a view similar to Figure 3 but showing the headrest in its rearward or seat ejection position; and Figure 5 is a sectional view taken on the plane of the line 5—5 in Figure 3.

Figure 1:
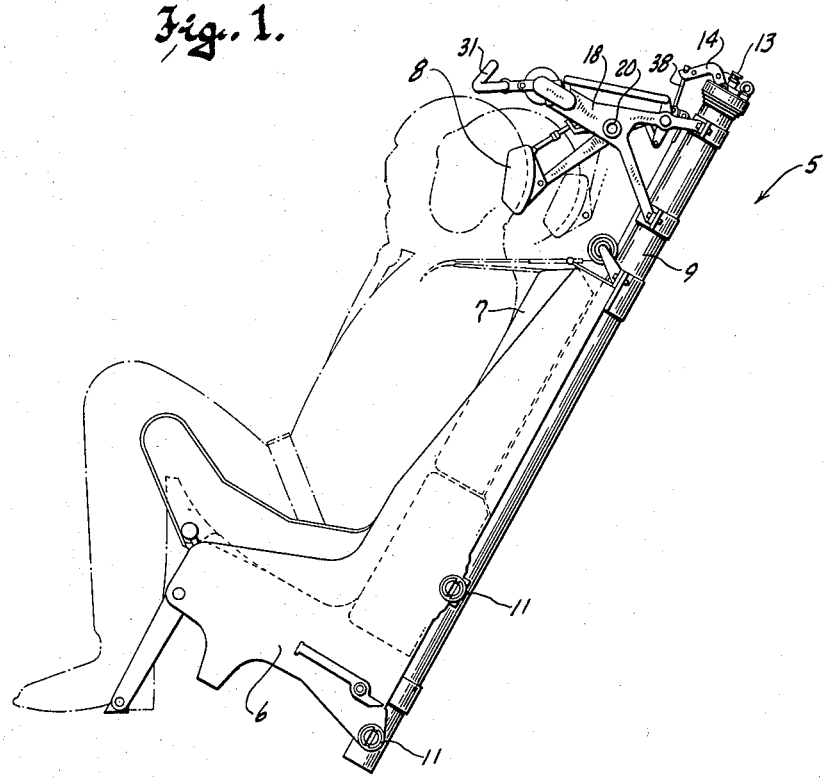
Figure 1 is a side elevational view of an airplane ejection seat embodying the principles of this invention.

Referring now to the accompanying drawings in which like numerals designate like parts throughout the several views, the numeral 5 designates generally an airplane ejection seat embodying the principles of this invention and which is adapted to be installed in an airplane to provide for seating of an airman during normal operation of the airplane.

The seat comprises generally a pan 6, a backrest 7 and a headrest 8, all secured to one of the tubular members 9 comprising a seat ejection gun which serves to propel the seat and its occupant out of the airplane when emergency departure from the aircraft becomes necessary in flight. During such ejection the tubular member receives the reaction of expanding gases generated by detonation of a charge of explosive material (not shown) housed in the ejection gun, and the seat is guided in its ejecting movement by roller means 11 mounted on the seat and cooperable with track means (not shown) fixed in the airplane and by which the seat is in effect "aimed" along a path substanially parallel to the vertical axis of the airplane.

For seat ejection the explosive charge is detonated by means of a detonating mechanism comprising a downwardly biased hammer 13 which is percussively engageable with a priming screw or detonator (not shown) in the ejection gun. A detonating lever or trigger 14 is medially fulcrumed, as at 17, on the upper end of the tubular member 9 of the seat ejection gun, and one end of said lever comprises a latch or sear 15 which is normally engaged under a downwardly facing shoulder 16 on the hammer to hold the hammer up against its bias. When the lever is rocked about its fulcrum to carry the latch 15 away from such engagement with the hammer, the hammer is released for percussive engagement with the detonator in response to the biasing force on the hammer. Such actuation of the detonating lever or trigger may be effected either by a main manually operable control means or by an auxiliary manually operable control means, both of which are described hereinafter.

The headrest 8 is supported on the tubular member 9 of the ejection gun for movement between a normal forward position shown in Figure 3 and a rearward seat ejection position shown in Figure 4, and is adapted to at all times supportingly engage the back of the head of the seat occupant, the forward position of the headrest being such that the occupant's head will be supported in a posture in which he will have ample vision for all normal operation of the airplane, while in its rearward position the headrest will support the occupant's head in a substantially upright attitude best suited for ejection.

The headrest is mounted for such movement upon a pair of substantially Y-shaped brackets 18, the bifurcations of which extend rearwardly and are secured at their rear ends to lugs 19 fixed on the tubular member 9. The Y-shaped brackets are disposed in substantially parallel planes and they cooperate in carrying, near the junctions of their bifurcations, a shaft 20 which extends laterally relative to the tubular member 9. Journaled on the shaft 20 is a sleeve 21 from which a pair of parallel arms 22 extend downwardly, and lateral trunnions 24 extend through these arms, at their lower ends, and into bearing flanges 25 projecting from the back of the headrest, to mount the headrest for pivotal motion relative to the arms.

Mounted on the front ends of the Y-shaped brackets is a substantially U-shaped yoke 26, the legs 27 and 28 of which extend forwardly and cooperate in rotatably supporting a tubular roller 29 upon which a face screen 30 is normally rolled up in the same manner as a window shade. (See Figure 5.) At its lower end the screen is connected with a handle or actuator 31 by which the screen may be drawn downwardly and forwardly in front of the face of the seat occupant. Drawing down the screen effects release of latch means (described hereinafter) by which the headrest is held in its normal position, freeing the headrest to be swung to its rearward ejection position; and the headrest is so connected with the detonating lever or trigger 14 that rearward motion of the headrest rocks the detonating lever in the direction to swing the latch or sear 15 out of engagement with the hammer.

Figure 2:
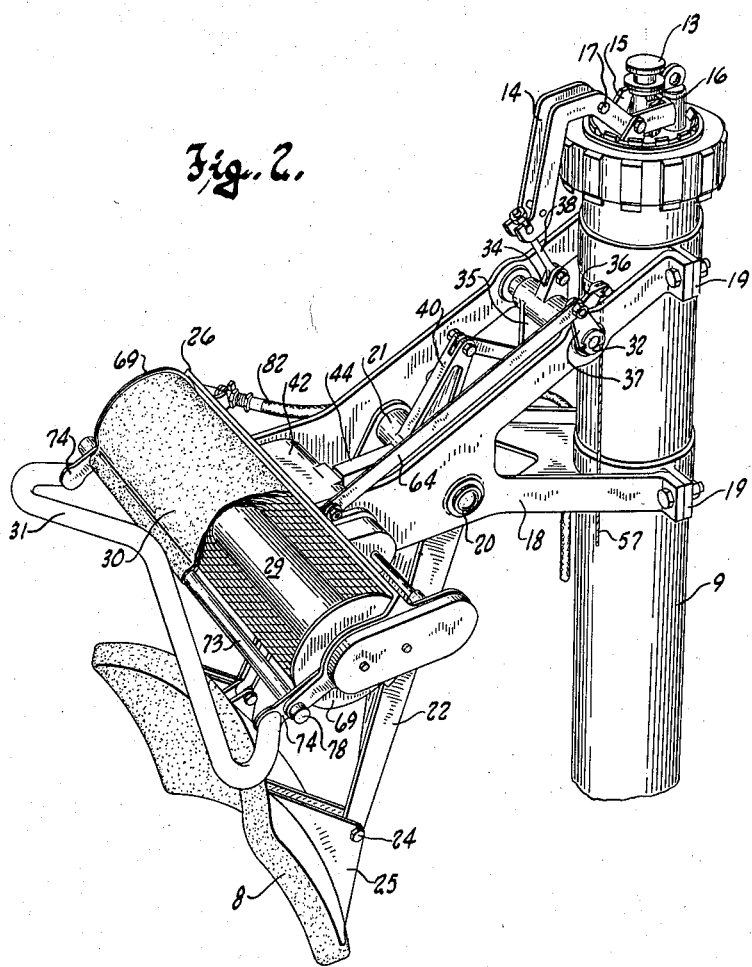
Figure 2 is a perspective view (with portions cut away) of the headrest and the upper portion of the seat ejection gun of the ejection seat shown in Figure 1, the headrest being shown in its normal or forward position.

A shaft 32 is carried by the upper bifurcations of the Y-shaped brackets, with its axis parallel to the headrest supporting shaft 20, and rotatably mounted on it are four radially projecting arms 34, 35, 36 and 37, the arms 34, 35 and 36 being disposed between the brackets and the fourth arm 37 being mounted on an end portion of the shaft which projects outside the brackets, as best seen in Figures 2 and 5. Two of the arms between the brackets, designated by 34 and 35, are connected with one another to swing in unison about the shaft and are respectively connected with the free end of the detonating lever 14 and with a radial projection 40 on the sleeve 21 which carries the headrest supporting arms 22. The connection between the arm 34 and the detonating lever 14 is provided by a link 38, and the connection between the arm 35 and the headrest supporting sleeve 21 is provided by a link 41. Thus, through the arms 34 and 35 and their associated links 38 and 41, swinging movement of the headrest supporting arms 22 is translated into rocking movement of the detonating lever 14.

The headrest is normally held in its forward position (shown in Figures 2 and 3) by means of a latch mechanism which normally locks a forwardly projecting arm 44, rigidly secured on the sleeve 21, against swinging movement. The latch mechanism (best seen in Figure 5) comprises an elongated, longitudinally bored housing 42 extending across the front ends of the Y-shaped brackets and projecting to one side of one of them, a locking sleeve 43 slidably and rotatably mounted in the bore in said housing, and a ball 46 normally confined in a rearwardly opening connecting bore in the housing and engaged in a hemispherical depression 45 in the front of the arm 44.

So long as the latch means remains in its locked condition shown in Figure 3, pivotal motion of the headrest about the trunnions 24 is prevented by a stabilizing link 47 connected between the headrest and a forwardly and downwardly projecting shelf-like extension 48 on the arm 44. At its lower end the stabilizing link 47 has a pivotal connection with the headrest, spaced above the pivot axis of the trunnions 24 and provided by a trunnion 49 which is engaged in a projecting boss 50 on the back of the headrest; and the upper end portion of the stabilizing link projects through a loosely fitting hole 52 in the shelf-like projection and has a nut 54 threaded onto it above said projection. The upper end of the stabilizing link 47 engages a downwardly facing abutment 55 on the underside of the housing 42, which thus cooperates with the nut 54 to confine the stabilizing link against axial motion when the headrest is locked in its normal position. The pivot points which define the movement of the headrest upon the arms 22 and the stabilizing link 47 are so disposed that as the headrest swings rearwardly it tilts slightly in a direction to cause it to maintain constant engagement with the back of the occupant's head.

The locking sleeve 43 provides for release of the ball 46 from locking engagement with the arm 44 either upon downward withdrawal of the face screen or upon actuation of an auxiliary or alternate release cable or actuator 57. To that end the locking sleeve has in its outer surface one groove or relief 58 which is normally disposed in radial alignment with the ball 46 but rotationally displaced therefrom and another groove or relief 59 which is normally maintained in rotational alignment with the ball but axially displaced therefrom. (See Figure 5.) When either of these grooves is brought into register with the ball, the ball may be displaced forwardly out of the hemispherical depression 45 in the arm 44, releasing the latter to swing downwardly and thus freeing the headrest for rearward movement.

Rotation of the locking sleeve is normally prevented by reason of the fact that its outer surface is splined near one end thereof, as at 56, and is engaged in an internally splined ring 60. The ring is rotatably confined in a circumferential groove 61 in the housing, but it is normally prevented from rotating by means of a radial arm 63 thereon which is connected, by means of a link 64, with the arm 37 on the portion of the shaft 32 which projects outside the Y-shaped brackets. Thus so long as the arm 37 is not rocked, the splined ring 60 precludes rotation of the locking sleeve to a position in which the groove 58 therein registers with the ball 46. However, the auxiliary release cable 57 is connected to the outer end of the arm 36 on the shaft 32, and the arm 37 is constrained to swing in unison with the arm 36, so that when the auxiliary release cable is actuated the arm 37 will be swung, imparting rotation to the ring 60 and thus to the locking sleeve, thereby permitting the ball to enter the relief 53 in the locking sleeve and disengage itself from the hemispherical depression 45 in the arm 44. There is a lost motion connection between the arm 36 which is connected with the auxiliary release cable and the arms 34 and 35 which are connected, respectively, with the detonating lever 14 and the projection 40 on the headrest mounting sleeve 21, which connection is provided by circumferentially spaced abutments 33 and 33' on said arms, so that before the detonating lever is actuated the locking sleeve 43 is rotated to a position in which it effects unlocking of the headrest for rearward motion.

When the latch means for the headrest is unlocked by actuation of the handle 31, the locking sleeve is displaced axially, to bring the groove 59 in the locking sleeve into register with the ball 46, and such axial displacement of the locking sleeve is effected by means of a rotatable shaft 66. One end portion 67 of the rotatable shaft 66 extends coaxially into the interior of the locking sleeve and said shaft and the locking sleeve have cooperating threads by which rotation of the shaft is translated into axial displacement of the locking sleeve, the sleeve, of course, being retained against rotation with the shaft by means of the internally splined ring 60 and its associated linkage. The other end portion of the rotatable shaft projects outside the housing 42, through a bearing 65 carried by a rearward extension 27' of one leg 27 of the yoke 26. Fixed on the outer end of the rotatable shaft is a driven gear 68 by which the shaft is caused to rotate along with the roller 29 upon which the face screen is mounted.

The tubular face screen roller 29 has larger diameter discs 69 at its ends which guide the screen as it is unwound from the roller, and a coaxial journal 70 projects from the end disc at one side of the roller and has a drive gear 71 fixed thereon. This journal cooperates with a bushing 93 secured to the opposite end disc of the roller to rotatably mount the roller on the legs 27 and 28 of the yoke 26. Between the drive gear 71 and the driven gear 68 on the rotatable shaft 66 is a transmission gear 72 which is carried by the leg 27 of the yoke and which is in meshing engagement with both the drive and driven gears, so that rotation of the screen roller is transmitted to the rotatable shaft 66. Hence, drawing the face screen downwardly off of the roller displaces the locking sleeve axially inwardly to bring the groove 59 therein into register with the ball 46, thereby releasing the latch mechanism.

It will be observed that once the latch mechanism is released, either by actuation of the face screen handle 31 or by actuation of the auxiliary release cable 57, the detonating mechanism may be actuated by movement of the headrest; that is, as the occupant of the seat moves his head rearwardly to an attitude suitable for ejection, he actuates the detonating lever 14. However, if the auxiliary release cable is actuated beyond the point at which it effects unlocking of the headrest, it causes the headrest to swing rearwardly and at the same time, because of the linkage between the headrest and the detonating lever, actuates the latter without necessitating movement of the occupant's head, so that the occupant of the seat has alternative means available to him for initiating seat ejection.

The free end of the face screen has a tube 73 secured thereto, extending parallel to the roller axis, and projecting laterally from the ends of this tube, parallel to one another, are a pair of side plates 74 to which the handle 31 is secured. The side plates 74 normally lie closely adjacent to the forwardly projecting legs 27 and 28 of the U-shaped yoke 26, and each of the legs carries a round headed detent pin 76. Each detent pin is biased inwardly, toward the other and its adjacent side plate, by means of a coiled compression spring 77 surrounding the detent pin and confined in a housing 78 on the front end of the leg of the yoke. The heads 79 of the detent pins engage in smaller diameter apertures in the side plates in register with the bore of the tube 73, and the screen handle is thus held in a normal retracted position from which it may be pulled down with a detent action.

After the occupant is clear of the airplane he may release the face screen from its roller 29 by pulling a Bowden wire 81 axially movably enclosed in a sheath 82 and connected with one arm 83 of a bell crank 84. The bell crank, which is mounted on a rearward extension 28' of the leg 28 of the U-shaped yoke, has its other arm 84' normally engaged under the enlarged head 85 of a locking pin 86 which extends coaxially through the bored bushing 93 into the interior of the roller. A retainer 87, which fastens the screen to the roller 29, extends substantially radially through the cylindrical wall of the roller and is normally engaged in a transverse medial wall 89 therein and held against displacement out of the roller by the locking pin. The locking pin is biased axially inwardly by means of a coiled compression spring 91 which surrounds it and reacts between an outwardly facing abutment 92 thereon and the bushing 93. Hence, when the occupant of the seat desires to release the screen from the roller, he pulls the wire 81, and the consequent swinging movement of the bell crank withdraws the locking pin outwardly against the bias of the spring 91, releasing the retainer from engagement with the roller.

From the foregoing description taken together with the accompanying drawings it will be apparent that this invention provides an airplane ejection seat of the character described which assures that the occupant of the seat will assume, during ejection of the seat, a posture best adapted for ejection, by reason of the fact that actuation of the seat may be effected by drawing downwardly in front of his face a protective screen, which action unlocks a headrest for motion from a normal forward position assuring ample vision for operation of the aircraft to a rearward ejection position, and by which movement of the headrest the detonating mechanism for the seat ejection gun is actuated. It will also be seen that the invention provides an alternative or auxiliary manually operable actuator for initiating seat ejection, movement of which to a predetermined position unlocks the headrest for such rearward motion, and further movement of which actuates the detonating mechanism and simultaneously swings the headrest rearwardly to its ejection position.

What is claimed as my invention is:

1. In combination with an airplane ejection seat of the type which is adapted to be propelled out of an airplane along with its occupant and an actuator which must be manually manipulated in order to effect seat ejection: a headrest adapted to supportingly engage the back of the head of an occupant of the seat; a supporting bracket fixed with respect to the seat; means mounting the headrest on the supporting bracket for movement of the headrest relative to the seat from a normal forward position in which the head of the occupant of the seat is supported in an attitude affording ample vision for operation of an aircraft in which the seat is mounted, to a rearward position in which the seat occupant's head is supported in a substantially upright position suitable for ejection; releasable latch means normally blocking movement of the headrest out of its forward position; and means connecting said latch means with said actuator whereby manipulation of said actuator effects release of the latch means.

2. In combination with an aircraft ejection seat of the type adapted to be installed in an airplane and comprising an elongated member to which the seat is attached, a manually operable actuator and trigger mechanism which must be tripped in order to effect ejection of the seat: a headrest adapted to supportingly engage the back of the head of an occupant of the seat; means mounting the headrest on said elongated member for movement of the headrest relative to the seat from a normal forward position in which the seat occupant's head is supported in an attitude affording ample vision for operation of an aircraft in which the seat is installed, to a rearward position in which the occupant's head is supported in a substantially upright position suitable for ejection; releasable latch means normally holding the headrest in its forward position; means connecting the actuator with the latch means whereby movement of the actuator effects release of the latch means; and means providing a connection between the headrest and the trigger mechanism by which rearward movement of the headrest subsequent to release of the latch means effects tripping of said trigger mechanism.

3. In combination with an ejection seat of the type adapted to be installed in an airplane and having trigger mechanism actuatable to effect propulsion of the seat and its occupant out of the airplane: a headrest mounted on the seat for movement relative to the seat from a normal forward position in which the headrest engages the back of an occupant's head to support the same in a posture affording ample vision for operation of the airplane to a rearward position supporting the head in an upright attitude suitable for ejection; means connecting the headrest with the trigger mechanism whereby rearward movement of the headrest actuates the trigger mechanism; a releasable latch normally holding the headrest in its forward position; and manually operable means connected with the latch for releasing the latch to permit the occupant to move the headrest rearwardly and thus actuate the trigger mechanism.

4. The ejection seat of claim 3 wherein said manually operable means for releasing the latch comprises: a screen carried by the seat and normally disposed in a retracted position above the headrest; a handle connected with the screen for drawing the same downwardly in front of the occupant's face; and means connecting said screen with the latch means whereby release of the latch means is effected in consequence of downward movement of the handle.

5. The ejection seat of claim 3 wherein said manually operable latch release means includes a first actuator adjacent to the headrest; and further characterized by the provision of auxiliary manually operable release means connected with said latch means and with the trigger mechanism for releasing the latch means and for actuating the trigger mechanism independently of movement of said first actuator adjacent to the headrest, said auxiliary means including a second actuator located remote from the headrest.

6. The ejection seat of claim 5 further characterized by the fact that said auxiliary manually operable release means is connected with the headrest for moving the same to its rearward position substantially concurrently with actuation of the trigger mechanism.

7. The ejection seat set forth in claim 3 further characterized by the provision of means connecting the manually operable latch releasing means with the trigger mechanism and by which the latter may be actuated without the need for the occupant of the seat to force the headrest back with his head.

8. The ejection seat set forth in claim 3 further characterized by the fact that said manually operable means for releasing the latch includes an actuator which must be moved a predetermined distance to release the latch; and further characterized by the provision of means rendered operative in consequence of movement of the actuator through said predetermined distance for connecting the actuator with the trigger mechanism to enable actuation of the trigger mechanism by additional movement of the actuator beyond said predetermined distance so that the occupant of the seat need not force the headrest rearwardly with his head in order to actuate the trigger mechanism.

9. The ejection seat set forth in claim 3 further characterized by the fact that said manually operable means for releasing the latch includes an actuator which must be moved a predetermined distance to release the latch; and further characterized by the provision of means rendered operative in consequence of movement of the actuator through said predetermined distance for connecting the actuator with the headrest to move the headrest rearwardly by additional movement of the actuator beyond said predetermined distance and thus enable actuation of the trigger mechanism by means of the actuator without necessity for the occupant of the seat to force the headrest rearwardly with his head.

References Cited in the file of this patent

UNITED STATES PATENTS

| | | |
|---|---|---|
| 2,467,763 | Martin | Apr. 19, 1949 |
| 2,579,683 | Lobelle | Dec. 25, 1951 |
| 2,708,083 | Martin | May 10, 1955 |
| 2,726,054 | Lesley et al. | Dec. 6, 1955 |

FOREIGN PATENTS

| | | |
|---|---|---|
| 624,143 | Great Britain | May 27, 1949 |